Oct. 13, 1964  M. F. PETERS  3,152,477
PRESSURE DIFFERENTIAL MEASURING DEVICES
Filed June 17, 1960  8 Sheets-Sheet 1
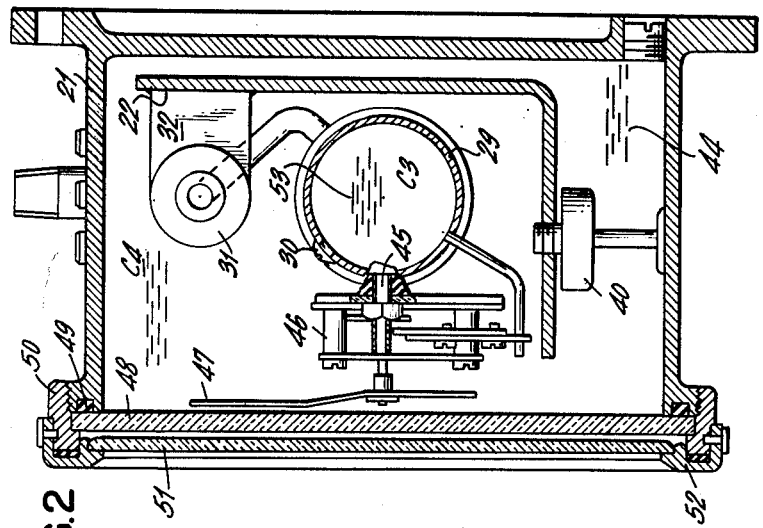
FIG.2
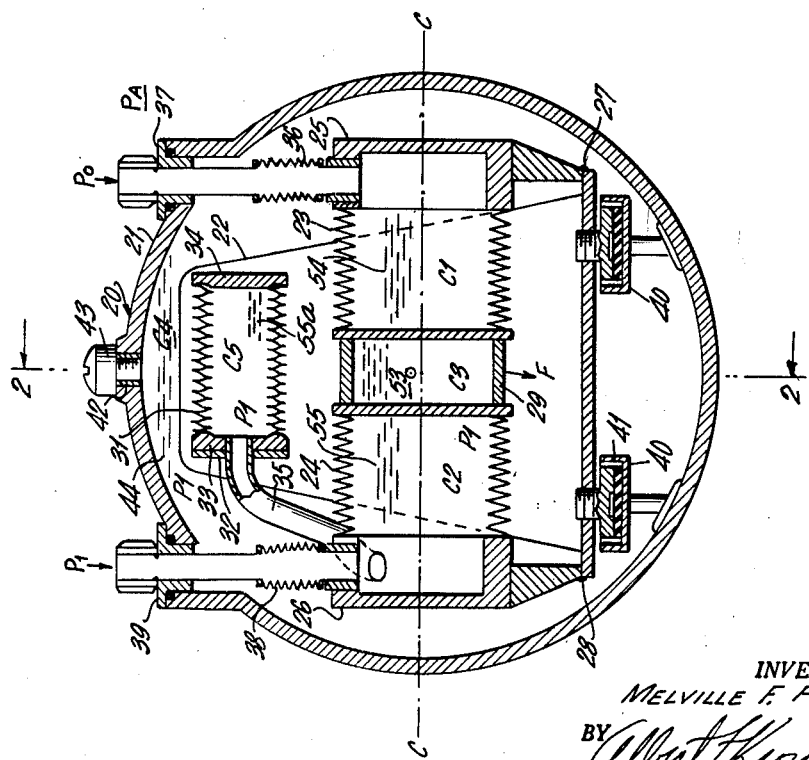
FIG.I
INVENTOR.
MELVILLE F. PETERS
BY
ATTORNEY Oct. 13, 1964  M. F. PETERS  3,152,477
PRESSURE DIFFERENTIAL MEASURING DEVICES
Filed June 17, 1960  8 Sheets-Sheet 2

INVENTOR.
MELVILLE F. PETERS
BY Albert T. Kornman
ATTORNEY

Oct. 13, 1964  M. F. PETERS  3,152,477
PRESSURE DIFFERENTIAL MEASURING DEVICES
Filed June 17, 1960  8 Sheets-Sheet 3
FIG.5
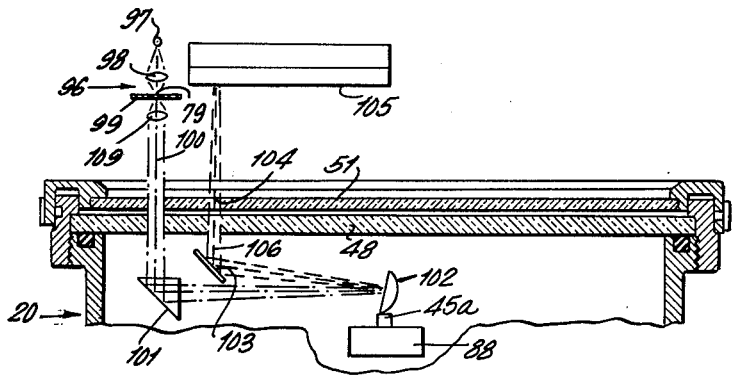
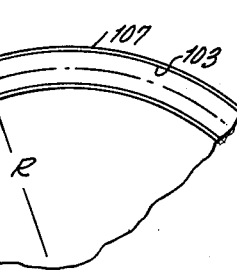
FIG.6
FIG.6A
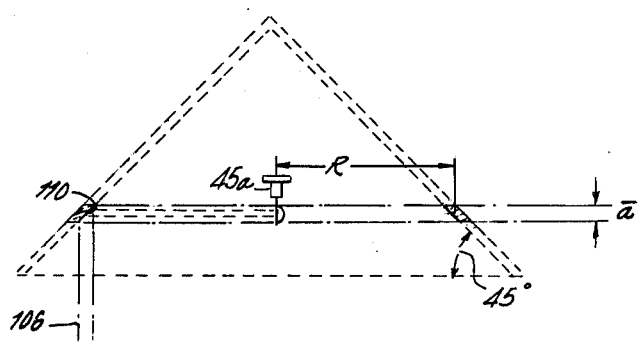
FIG.7
INVENTOR.
MELVILLE F. PETERS
BY
ATTORNEY

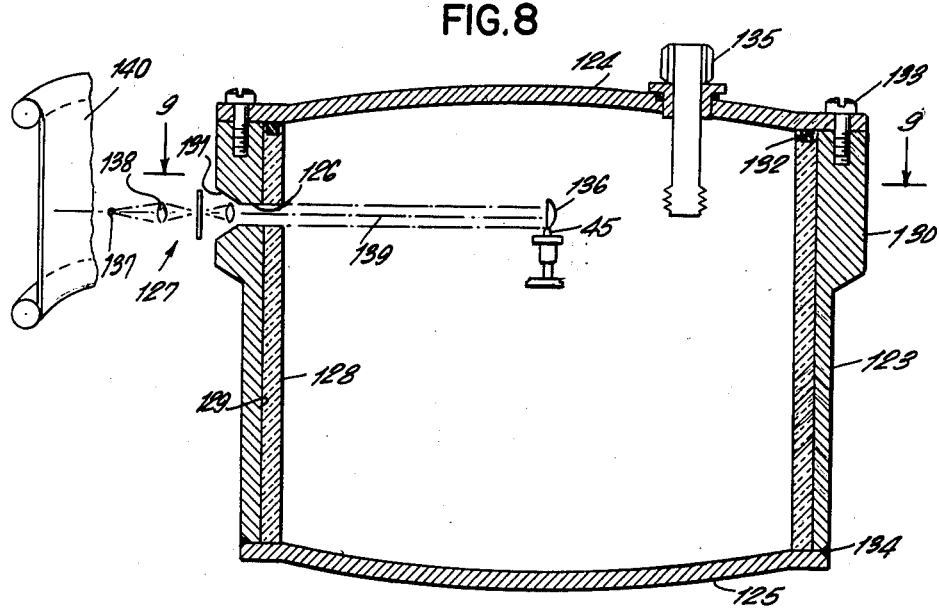
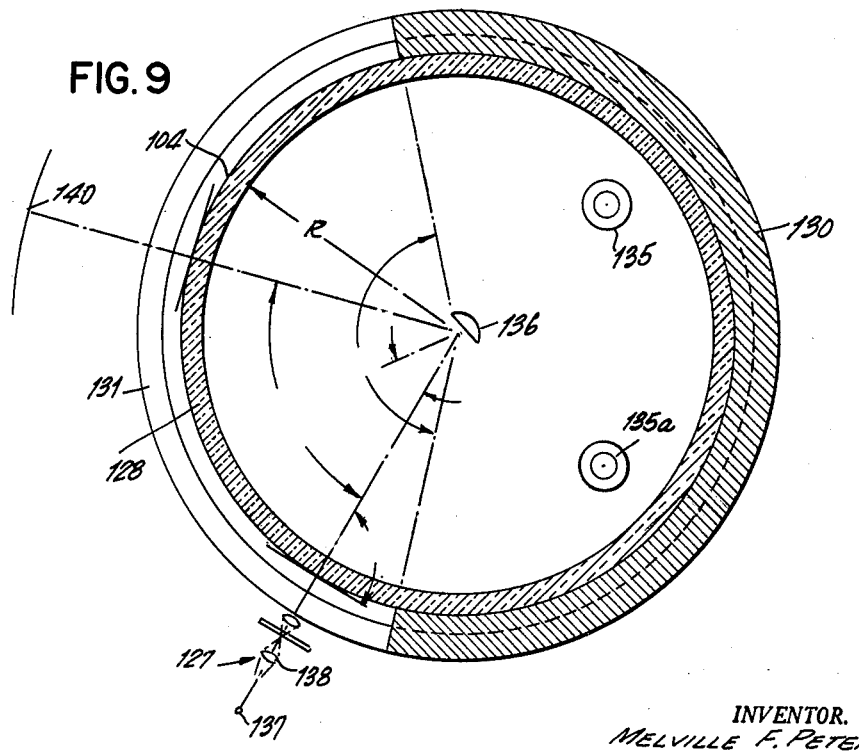

Oct. 13, 1964  M. F. PETERS  3,152,477
PRESSURE DIFFERENTIAL MEASURING DEVICES
Filed June 17, 1960 8 Sheets-Sheet 5
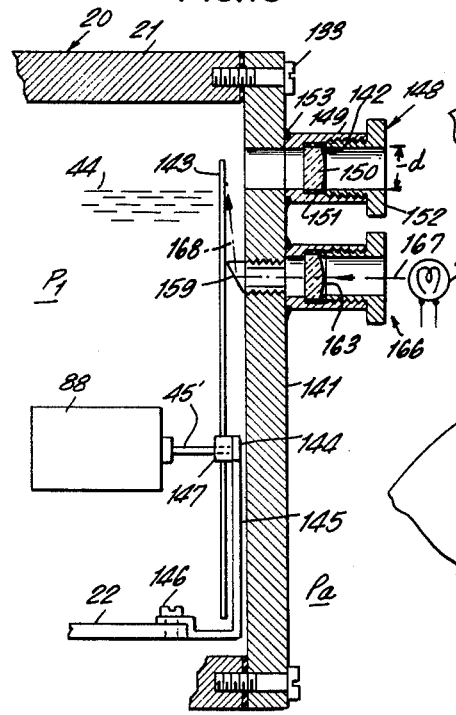
FIG.10
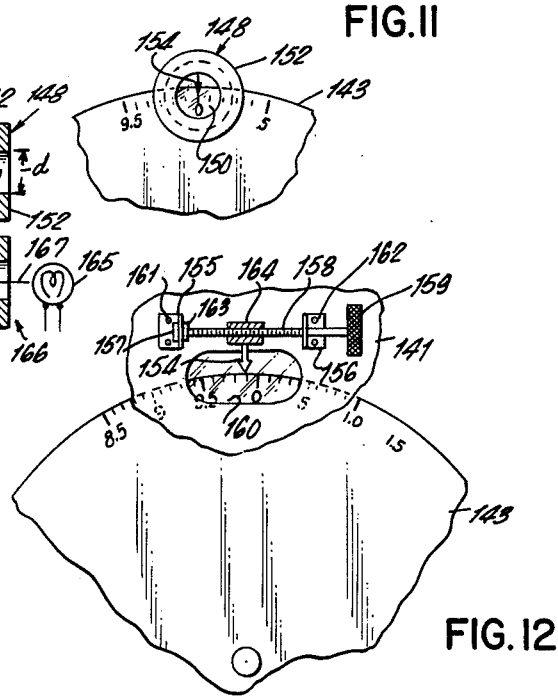
FIG.11
FIG.12
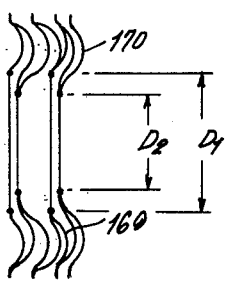
FIG.15
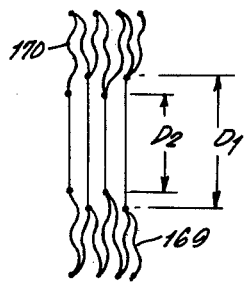
FIG.16
INVENTOR.
MELVILLE F. PETERS
BY Albert F. Kronman
ATTORNEY Oct. 13, 1964        M. F. PETERS        3,152,477
PRESSURE DIFFERENTIAL MEASURING DEVICES
Filed June 17, 1960        8 Sheets-Sheet 6

INVENTOR.
MELVILLE F. PETERS
BY
ATTORNEY

Oct. 13, 1964 M. F. PETERS 3,152,477
PRESSURE DIFFERENTIAL MEASURING DEVICES
Filed June 17, 1960 8 Sheets-Sheet 7

INVENTOR.
MELVILLE F. PETERS
BY Albert F. Kronman
ATTORNEY

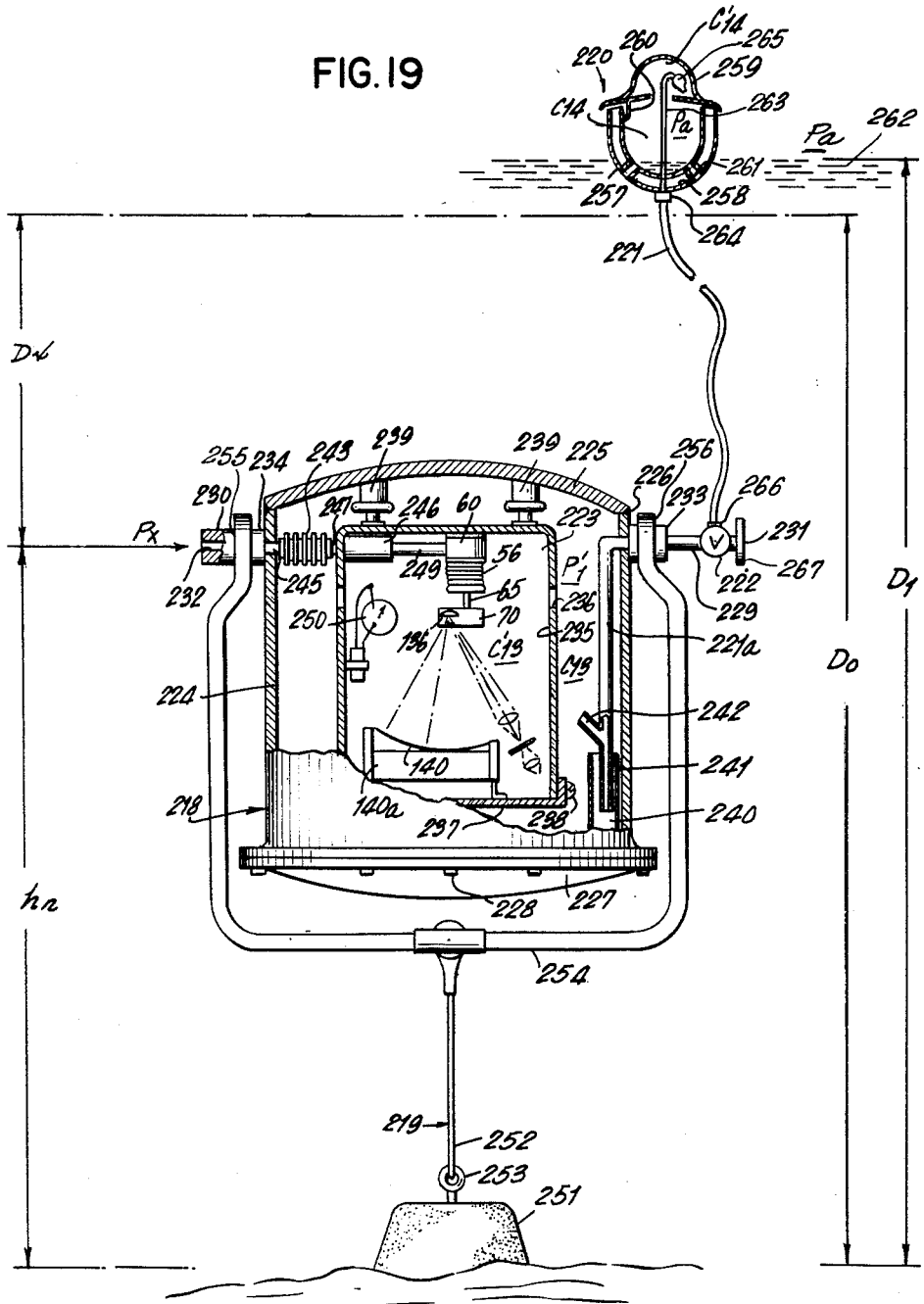

United States Patent Office 3,152,477
Patented Oct. 13, 1964

3,152,477
PRESSURE DIFFERENTIAL MEASURING
DEVICES
Melville F. Peters, 29 N. Ridge Road, Livingston, N.J., assignor of fifty percent to Joseph J. Mascuch, Millburn, N.J.
Filed June 17, 1960, Ser. No. 36,987
4 Claims. (Cl. 73—410)

This invention relates to gages which can measure small pressure differentials in systems operating at high pressures and particularly to gages which can measure small differential pressures of a transient nature when the high pressure within the system is fluctuating.

Gages are often required to measure the small pressure differentials in systems which change in absolute pressure by several thousand p.s.i. during the course of the measurements. When these small pressure differentials are measured by gages employing bellows, diaphragms, bourdon tubes and the like, as the flexible elements in the sensing unit, it is necessary to use thin material in the walls of the flexible elements to obtain the desired sensitivity. While the use of thin material in these flexible elements will produce gages having the desired sensitivity, it also results in sensing elements which cannot withstand large pressure differentials without becoming damaged. It is therefore necessary in making gages for measuring small pressure differentials in systems operating at high pressure, to provide supporting surfaces for the flexible elements. These supporting surfaces must limit the pressure differential across all of the flexible elements in the gage to pressure differentials which are, for all practical purposes, no greater than the small pressure differential to be measured. It is further necessary to make the movement of the sensing element independent of the supporting surfaces by arranging the said surfaces in such manner that if they create forces on the sensing element the algebraic sum of all such forces will be equal to zero. It is possible to provide a supporting surface meeting these requirements by enveloping the sensing bellows with a liquid which is confined by the case of the gage.

In addition to protecting the bellows against high ambient pressures, it may be necessary to increase their resistance to shock without the use of rubbing surfaces. Resistance to shock can be achieved in the sensing assembly by arranging the bellows so that the pressure from one region of the system acts on one bellows and the pressure from a second region of the system acts on another bellows. The two bellows are supported in line, so that if both bellows have equal effective areas, the pressure differential indicated by the gage will be proportional to the pressure differential to be measured. If the effective areas of the bellows differ by 2% or 3%, the values indicated by the gage will be in error by an equal amount. To reduce this error in the manufacture of gages, it is common practice to measure the effective areas of a large number of bellows and to select pairs of bellows for the sensing elements which have approximately the same effective areas.

When sensitivity is of greater importance than shock resistance, the construction of the gage can be simplified, and the labor of selecting matched bellows eliminated by using only one sensing bellows in the actuating mechanism. The small pressure differential across the bellows in the gage is made independent of the absolute pressure and proportional to the relatively small pressure differential acting across the sensing bellows by applying the pressure existing in one region in the system to either the inside or outside of the bellows, and using a second bellows not mechanically connected to the sensing bellows assembly to transmit the pressure existing in the second region of the system to the outside or inside of this second bellows by means of a fluid confined in the case of the gage. This arrangement of bellows elements will transfer the high pressure gradient from the bellows to the case as was done when two bellows were used in the flexible assembly, without introducing the possibility of obtaining erroneous readings by having two bellows in the actuating portion of the assembly which do not have equal effective areas.

When a pressure differential must be measured in corrosive fluids, it is necessary or at least desirable, to isolate the multiplying elements of the gage which have rubbing surfaces from the gage. This precaution should be taken since the smallest amount of foreign material on the rubbing surfaces will produce frictional losses which will lead to inaccurate indications of the pressure differential. Isolation of the moving elements from the corrosive fluids can be accomplished by confining these fluids to either the inside or outside of the bellows and placing the rubbing parts in a portion of the gage which contains non-corrosive liquids. The bellows contacting the corrosive fluids can be made of corrosion resisting metals or plastics and the non-corrosive liquid can be a silicon oil. Silicon oil is preferred because it is transparent, has a working range from minus 70° F. to plus 350° F., or more, and can be considered non-corrosive when contacting many kinds of metals which are used for bellows plates.

To obtain high sensitivity of the flexible element of the gage, it is necessary to use bellows having many plates or convolutions. Such structures constitute a relatively long bellows assembly. If the fluid in the system is a heavy liquid, the weight of the unsupported portion of the long bellows filled with this heavy liquid will cause the bellows to sag. This sagging can be eliminated by making a portion of the flexible assembly hollow so that the buoyancy of the assembly in the enveloping liquid will just balance the gravitational forces causing the assembly to sag.

Important applications for gages such as are described herein, which can measure relatively low pressure differentials in systems operating at high ambient pressures are in the measurement of tides, swells, water-waves, under water explosions, and in the operation of vessels below and on the surface of the sea. When pressure measurements are to be made near the surface of the water, the differential pressure measurements can be made between the pressure of the air above the water and the pressure at some designated depth below its surface. By using the barometric pressure above the surface of the water as the reference pressure, changes in the barometric pressure are not indicated or recorded as changes in the depth of the water.

Accordingly, it is an object of the present invention to produce a gage which can measure small pressure differentials in systems operating at high pressure.

Another object of the present invention is to provide a gage for measuring small pressure differentials in high pressure systems which will not require elaborate sealing devices.

A further object of the present invention is to provide a gage which will indicate and record small pressure differentials while exposed to high ambient transient or static pressures.

An object of the present invention is to provide a pressure and temperature recording assembly which can be used to measure pressures below the surface of the water, where the reference pressure can be the barometric pressure above the surface of the water, or a chamber charged to a known pressure.

Still another object of the present invention is to provide a pressure and recording unit to measure transient pressure changes which is provided with a flexible assembly which creates a reference pressure equal to the ambient static pressure.

An object of the present invention is to provide a pressure sensing assembly which can be used to control the fluid pressure in a system.

A feature of the present invention is its use of an enveloping fluid to provide a supporting surface for the flexible elements of a gage.

Another feature of the present invention is its use of a flexible assembly to keep the fluid in the system from mixing with the fluid in the case of the gage.

A further feature of the present invention is its use of a pressure equalizing bellows to transfer the high pressure differential in the system from the bellows in the sensing assembly to the wall of the case of the gage, or to a wall which is substituted for the case of the gage.

A feature of the present invention is its use of confining means to keep corrosive fluids in the system within the bellows of the sensing element and to place a fluid on the opposite side of the bellows which protects the rubbing surfaces in the gage assembly from the fluids in the system.

A further feature of the present invention is its use of a float or buoyant material incorporated in the sensing element whereby the buoyancy of the sensing element within the liquid will just balance the forces which tend to cause the element to sag.

A feature of the present invention is its use of a pressure chamber within flexible walls whereby the earths gravitational field will exert a constant force on the wall to produce a standard reference pressure within the gage.

Another feature of the present invention is to provide a means of dampening the bellows assemblies when they are subjected to shaking forces which cause them to vibrate by using bellows having alternate plates or convolutions of different diameters.

Still another feature of the present invention is its use of bellows which can nest to prevent damage to the bellows structure under conditions where the pressure exceeds the operational limits of the said bellows.

A further feature of the present invention is to provide means such as a beam of light or magnetic flux to traverse the wall of the gage and record the movement thereof without requiring an opening in the said gage case.

The invention consists of the construction, combination and arrangement of parts, as herein illustrated, described and claimed.

In the accompanying drawings, forming a part hereof are illustrated several forms of embodiment of the invention, in which drawings similar reference characters designate corresponding parts and in which:

FIGURE 1 is a somewhat diagrammatic cross-sectional view of a high pressure gage made in accordance with the present invention.

FIGURE 2 is a somewhat diagrammatic view in longitudinal section taken on line 2—2 in FIGURE 2, looking in the direction of the arrows.

FIGURE 5 is a diagrammatic fragmentary view of a gage similar to that shown in FIGURE 2, illustrating the optical system whereby gage movements can be recorded.

FIGURE 6 is a fragmentary view of a portion of an optical system suitable for use in conjunction with the gage shown in FIGURE 5.

FIGURE 6a is a view in side elevation of the light reflecting members shown in FIGURE 6.

FIGURE 7 is a somewhat diagrammatic view in side elevation showing the manner in which another form of light reflecting member can be provided for the optical system shown in FIGURE 6.

FIGURE 8 is a cross-sectional view taken through a gage case showing the manner in which an optical device may be used for recording gage movement.

FIGURE 9 is a view in horizontal section taken on line 9—9 of FIGURE 8.

FIGURE 10 is a somewhat diagrammatic view in side elevation showing a movable scale with a stationary viewing window.

FIGURE 11 is a fragmentary front view of the window shown in FIGURE 10.

FIGURE 12 is a fragmentary view of an elliptical window with a screw arrangement for setting the indicating arrow at zero reading on the scale when the pressure differential is zero.

FIGURE 15, 16, are fragmentary cross-sectional views of two piston area bellows which are used in the flexible assembly as self dampening units.

FIGURE 19 is a view in side elevation partly cut away of a pressure and temperature recording device, an application of the present invention.

Figure 4:
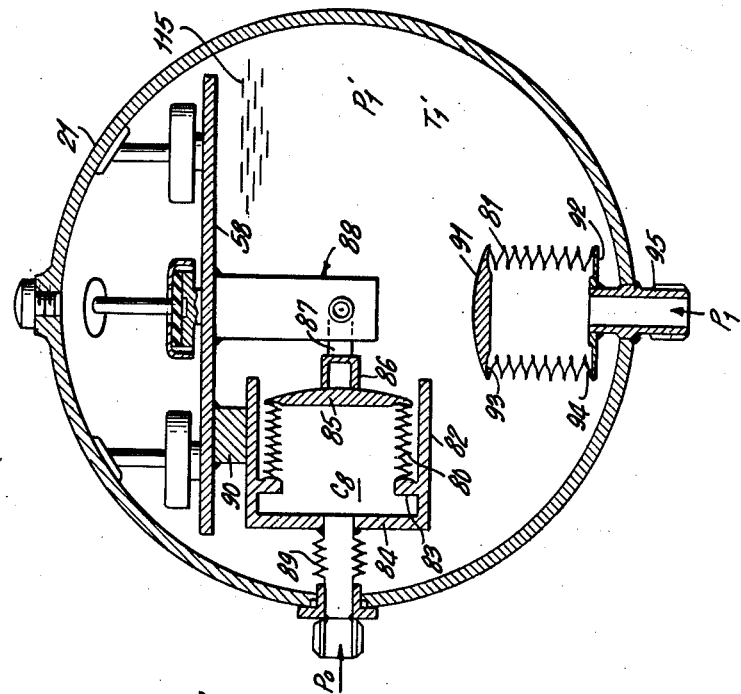
FIGURE 4 is a view similar to FIGURE 3, comprising a third embodiment of the present invention.

Referring to the drawings and particularly to FIGURES 1 and 2, 20 indicates a gage having a case 21 within which there is secured a support frame 22. A bellows 23 and a second bellows 24 are carried within the case 21 by the frame 22. An end fitting 25 is secured to one end of the bellows 23 and is welded to the support frame 22 at 27. A second end fitting 26 supports one end of the bellows 24 and is welded to the support frame 22 at 28. The bellows 23, 24, are disposed along a common axis and are secured to a hollow cylindrical cap member 29 therebetween. Chambers $C_1$, $C_2$ and $C_3$, are thus provided within the bellows 23, 24 and the cap member 29. It will be observed that the cap member 29 is in the form of a small hermetically sealed tank. As shown in FIGURE 2, a screw 30 is provided in the cap member 29 and may be removed in order to permit fluids or granular material to be poured into chamber $C_3$.

A pressure equalizing bellows 31 is also carried within the casing 21 and is secured to the support frame 22 by means of a plate 32 and end fitting 33. The equalizing bellows 31 serves to equalize the pressure between the fluid system and the liquid in the gage 20, while preventing the mixing of said fluid and liquid. The bellows 23, 24, have the same effective area so that equal pressure applied to each bellows will result in a precise balance between the two.

The equalizing bellows 31 is secured to the end fitting 33 and a cap 34 overlies the opposite end of said bellows 31 to seal it. The chamber within the equalizing bellows 31 has been designated by the legend $C_5$. A conduit 35 interconnects the chamber $C_5$ within the bellows 31 with the chamber $C_2$ in bellows 24. A flexible conduit 36 leads from the outside of the case 21 into the chamber $C_1$ of bellows 23. The conduit 36 is attached to the end fitting 25 on bellows 23. The upper end of the conduit 36 is welded to a bushing 37, which in turn is welded to the case 21. A second flexible conduit 38 is connected at one end to the end fitting 26 and at its other end to a bushing 39 which in turn is welded to the case 21. The second flexible conduit 38 is adapted to conduct liquids from the exterior of the gage into the chamber $C_2$ of bellows 24.

The support frame 22 is secured to the casing 21 by flexible mounting assemblies 40. The flexible mounting assemblies 40 are provided with resilient inserts 41 whereby shaking forces applied to the case 21 will not be transmitted to the supporting frame 22.

The top of the case 21 is provided with a threaded opening 42 to receive therein a plug 43. The plug 43 may be unscrewed from the case 21 to permit fluids to be poured into the said case. Thereafter, the plug may be replaced to hermetically seal the fluid 44 within the chamber $C_4$ of the casing 21.

A pin 45 is secured to the wall of the cap member 29 as shown in FIGURE 2 to actuate a conventional multiplying assembly 46 whereby the motion of the bellows 23, 24, is converted into movement of the pointer 47, in the gage. The front of the gage 20 is covered by a transparent cover member 48 in the nature of a plate strong enough to withstand the high pressure in the system. A gasket or O-ring 49 forms a seal between the plate 48 and the case 21 of the gage. A sealing ring 50 is employed to force the plate 48 against the gasket 49 to form a fluid seal at this point. A transparent disc 51 is secured to the front of the plate 48 by means of a ring 52. The disc 51 is provided with a scale thereon through which the pointer 47 may be seen. The ring 52 may be shifted around the gage 20 in order to bring the disc 51 and its scale into proper registration with the pointer 47.

Before the chamber $C_4$ of the case 21 is filled with liquid 44, it is necessary to put the correct amount of fluid 53 in the chamber $C_3$ of the cap 29 so that the flexible assembly consisting of the fluids 53, 54, 55, in the cap 29 and the bellows 23, 24, respectively, will produce a force F caused by the earth's gravitational field equal in magnitude but opposite in direction to the buoyancy which will be exerted by the liquid 44 on this assembly when the chamber $C_4$ is filled. When these conditions are satisfied the central axis CC of the bellows 23, 24, and cap member 29, will be straight to horizontal. This balancing of the sensing assembly with the fluid 44 allows the gage to be rotated about the axis CC without disturbing the position of the pointer 47. Consequently, the differential pressure reading is not changed by rotating the gage about the axis.

The pressure P1 in fluid 44 will also be equal to the pressure P1 in bellows 24, since a change in temperature of the fluid 44 will cause the equalizing bellows 31 to change in volume by being elongated or compressed. To accomplish this over a reasonable range of temperatures it is advisable to make bellows 31 large enough so that its overall change in volume will be equal to 10% of the volume of the liquid 44 in the case 21.

When a pressure $P_0$ is applied to bellows 23 through conduit 36, and a pressure $P_1$ is applied to bellows 24 through conduit 38, a pressure differential of $(P_1-P_0)$ will act on the cylindrical cap member 29. Since each bellows exerts a spring force which is proportional to its displacement, the displacement of the bellows assembly consisting of bellows 23, 24, and cap member 29 will be proportional to the differential $(P_1-P_0)$ since the algebraic sum of the pressure $P_1$ acting on the outer surface of the two bellows 23, 24, will be zero. The absolute pressure of $P_1$ is conducted to the fluid 55a in bellows 31 through conduit 35. The bellows 31 contracts or expands and in this manner transmits the pressure $P_1$ to the fluid 44. The fluid 44 transmits the pressure $P_1$ to the outer surfaces of the bellows 23, 24, and to the inner surfaces of the case 21. The pressure differential across the bellows 23 is $(P_1-P_0)$ which is small, the pressure differential across bellows 24 is $(P_1-P_1)$ which is zero, and the pressure differential across case 21 is $(P_1-P_A)$ which may be small or several thousand pounds, since $P_A$ is ambient pressure. Thus bellows 31 acting on the fluid 44 has transferred the high pressure from the weak bellows assembly 23, 24, 29, to the case 21 without allowing fluids 54, 55, within bellows 24, 23, to mix with the liquid 44.

When the pressure differentials are to be read directly from the gage, the zero position of the scale on the disc 51 is set by rotating the said disc by means of rings 52 until the zero position of the scale coincides with the position of the pointer 47, when the differential pressure is zero. Changes in differential pressure will then appear as displacement of the pointer 47.

The gage shown in FIGURES 1 and 2 requires that the bellows 23, 24, be selected so as to have exactly equal effective areas. However, the gage shown in FIGURE 3 employs only one bellows in the sensing unit thereby eliminating the rigid requirement for matching bellows.

Figure 3:
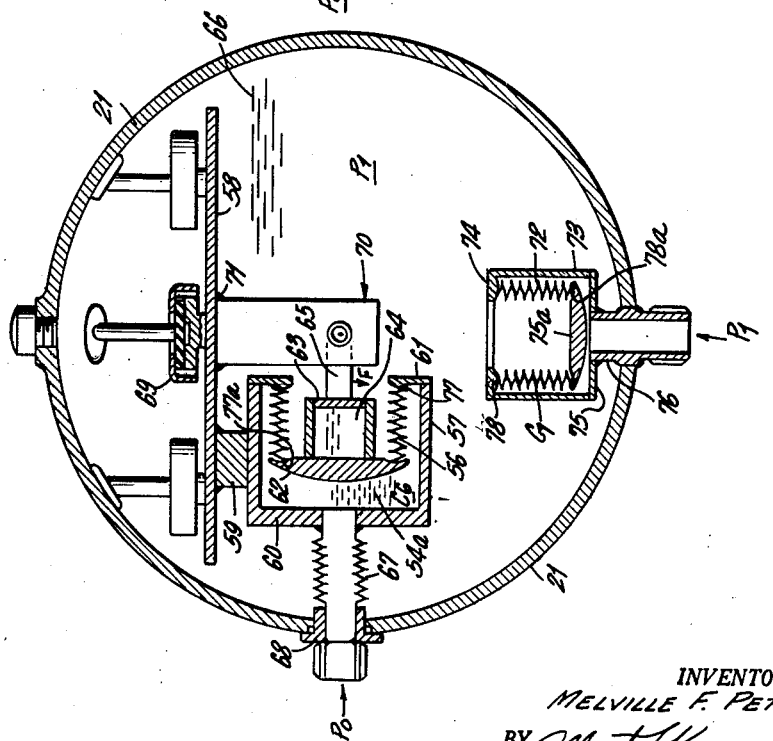
FIGURE 3 is a somewhat diagrammatic cross-sectional view of a high pressure gage, a second embodiment of the present invention.

The sensing bellows 56 shown in FIGURE 3 is carried within a thimble member 57 within the case 21 of the gage. The thimble 57 is secured to a supporting plate 58 by a bracket 59. The thimble 57 is closed at one end by a cover member 60 and provided with an inwardly disposed shoulder 61 at its opposite end.

The sensing bellows 56 is attached at one end to the inside surface of the shoulder 61 by welding, brazing or the like. The opposite end of the bellows 56 is covered by a cap 62 and forms a fluid tight chamber within the thimble 57 indicated by the legend $C_6$.

A small hollow enclosure 63 is secured to the cap 62 on the bellows side thereof. The enclosure 63 is filled with a suitable quantity of liquid 64 so that the flexible actuating assembly consisting of the sensing bellows 56, the cap 62, the enclosure 63, and an arm 65 attached to the enclosure 63 will produce a force F acting in the direction of the earth's gravitational field which is equal in magnitude but opposite in direction to the sum of the buoyances exerted by the fluid 66 within the case 21, and fluid 54a in chamber $C_6$. This buoyance is measured when the bellows is compressed sufficiently to indicate half its full scale reading.

The chamber C is connected to the outside of the casing 21 by a flexible conduit 67 which communicates at one end with the interior of the chamber $C_6$ and at its other end with a threaded fitting 68 carried by the wall of the case 21.

The support plate 58 is secured to the inside of the case 21 by flexible mounting assemblies 69 similar to those shown in FIGURES 1 and 2. The flexible mountings 69 isolate the support plate 58 from the shaking forces operating on the case 21.

The arm 65 which is connected at one end to the enclosure 63 is in contact with an element of the gage multiplying assembly 70. The multiplying assembly is secured to the support plate 58 as indicated at 71.

A pressure receiving and equalizing bellows 72 is carried within the casing 21 and is supported by a second thimble 73. The thimble 73 is provided with an inwardly disposed shoulder 74 on its inner end and a flat plate-like closure member 75 overlying its outer end. The pressure equalizing bellows 72 is secured at one end to the shoulder 74 and at its other end to a cap-like member 75a which forms a chamber $C_7$ within the thimble 73. A small conduit 76 connects the chamber $C_7$ with the outside of the case 21.

It will be noted that both the bellows 56 and the pressure receiving bellows 72 are of a configuration such that when pressure is applied to them they will nest and thereby prevent damage to the bellows elements should the pressure exceed the limits of the bellows. By nesting bellows is meant bellows, the adjacent elements of which will fit into one another so that when the bellows is compressed each of the elements forming the bellows structure is supported on each side by the adjacent elements and the whole assembly is in effect a cylinder. In addition, the supporting shoulders 61 and 74 are provided with seats 77, 78, which conform in shape to the adjacent element of the bellows to support said element over its entire area. The cap members 62, 75a, are formed with bellows receiving surfaces 77a, 78a to conform to the bellows element adjacent thereto. It will be observed that the nesting bellows when compressed is capable of withstanding pressures far in excess of the normal pressures which can be tolerated by a bellows having similar wall thickness but which are not of the nesting type.

When the gage shown in FIGURE 3 is in operation the bellows 56 will have its outer surface subjected to pressure $P_0$ and its inner surface subjected to pressure $P_1$, which is the pressure within the case 21. The force actuating the multiplying unit 70 through the enclosure 63 and arm 65 is equal to $(P_1-P_0)\bar{A}$ where $(P_1-P_0)$ is the pressure differential and $\bar{A}$ is the effective area of bellows 56. This force is entirely independent of the effective area of bellows 72 which is the bellows used to transmit the pressure $P_1$ from the inner surface of its walls to the fluid 66 within the casing 21.

The pressure differential between the inside and the outside surfaces of the bellows 31 in FIGURES 1 and 2, and pressure differential between the inside and the outside surfaces of bellows 72 in FIGURE 3 can be made negligibly small by constructing each of these bellows from very thin material so that the fluid pressure $P_1$ can be assumed to exist on both sides of the bellows. When this precaution is taken the sensitivity of the sensing bellows assembly shown in FIGURE 3 can be made greater than the sensitivity of the sensing bellows assembly shown in FIGURES 1 and 2, since the pressure constant of the two bellows 23, 24, in FIGURE 1, must be greater than the pressure constant of the single bellows 56 in FIGURE 3. Since the shoulder 61 is the only rigid support for bellows 56, the resistance to shock of the sensing assembly actuated by bellows 56 is less than the resistance to shock of the sensing assembly actuated by bellows 23, 24. Consequently, while the gage shown in FIGURE 3 is more sensitive than the gage shown in FIGURES 1 and 2, it is also more easily damaged by shock waves than the sensing bellows in FIGURES 1 and 2.

Referring to FIGURE 4, there is shown a gage assembly similar to that of FIGURE 3 except for the specific arrangement of the sensing bellows and the pressure equalizing bellows.

In FIGURE 4 the sensing bellows 80 and the pressure equalizing bellows 81 are both of the nesting type. The sensing bellows 80 is carried within a thimble 82 and is secured at its inner end to a small shoulder 83 which is spaced from the plate-like member 84 which overlies the outer end of the thimble 82. The opposite end of the thimble 82 is open and a cap 85 which is secured to the opposite end of the sensing bellows 80 and seals it, is positioned within the open end of the thimble 82. A small float chamber 86 is attached to the outer surface of the cap 85 and is also secured to the actuating arm 87 of the gage multiplier unit 88. The float member 86 serves to balance the gravitational forces acting upon the bellows and cap assembly 80, 85. The cap member 85 forms a chamber $C_8$ within the thimble 82. A flexible conduit 89 connects the interior of the chamber $C_8$ with the exterior of the gage case 21. The thimble 82 is secured to the support plate 58 by means of a bracket 90. When the pressure within the case 21 exceeds the pressure $P_0$ by a substantial amount the bellows 80 will be compressed until it nests upon the shoulder 83 as hereinabove described. The construction of the pressure equalizing bellows 81 is such that it too will nest when the pressure $P_{1'}$ within the case 21 exceeds the pressure $P_1$ by a substantial amount. The bellows 81 is secured at its free end to a sealing cap member 91 and at its opposite end to a small plate 92. Both the cap member 91 and plate 92 are provided with seats 93, 94, to support the adjacent elements of the bellows 81 when it is nested. A conduit 95 connects the interior of the bellows 81 with the exterior of the casing 21. When the fluid 115 within the casing 21 is a high pressure gas at a pressure $P'_1$ at a temperature $T'_1$ and the pressure $P_0$ and $P_1$ are small, both bellows 80 and 81 will nest and remain nested until the pressure differential $(P'_1-P_0)$ and $(P'_1-P_1)$ becomes small enough for the bellows 80 to elongate and actuate the pointer or other indicating means through the multiplying unit 88. In this manner the pressure differential $(P_1-P_0)$ or the equivalent pressure differential $(P'_1-P_0)$ is indicated.

In high pressure gages such as are shown in FIGURES 1–4, it is most advantageous that the registered pressures be read or recorded without cutting holes in the case. Such results can be achieved by bringing the information supplied to pin 45 by the sensing element to the recorder or indicator by some form of radiation. If a magnetic recorder is used, magnetic radiation can be transmitted through a case made from material having a permeability of 1, or a magnetic or electrostatic pick-up unit can be used. A simple arrangement is to place an isotope on pointer 47 which emits radiation and focus this radiation on a scale which is excited by the beam of rays, or mix an isotope such as $C_{14}$ which emits $\beta$ rays with a material which fluoresces and use the fluorescence to illuminate the scale. Another arrangement is to replace pointer 47 with a mirror and by supplying a suitable optical system outside the case, reflect light from the mirror to the light sensitive paper on the recorder, or reflect the light to a scale, so that the beam of light on the scale will indicate pressure readings in the same manner as pressure readings were indicated by the pointer.

An optical system which can be used with the gages shown in FIGURES 1–4 inclusive is shown in FIGURE 5. The optical unit 96 used to produce a beam of parallel rays of light consists of a source of light 97, a lens 98 in front of the light source which collects the light and brings it to a focus on the small hole 79 in plate 99. A second lens 109 collects the light from the hole and produces the parallel beam 100. These rays are directed normal to and traverse the two transparent discs 48, 51. After entering the gage 20, the beam 100 is reflected by the total reflecting prism 101, to the concave mirror 102 which is attached to pin 45a of the multiplying unit 88. The concave mirror 102 directs the beam of light 100 to a specially constructed reflecting surface 103 which in turn directs the reflected light 106 upon scale 104, or directs the beam of light along a path which for all practical purposes is normal to the two discs, 48, 51. The light may then be recorded on a light sensitive paper indicated at 105.

The mirror 102 is made concave so that the reflected beam of light 106 is focused upon scale 104, or upon the light sensitive paper 105. The beam of light is arranged so that it enters and leaves the gage along paths normal to the transparent discs or windows 48, 51, so that the indicated pressure values are independent of the index of refraction of the transparent material, of the said discs.

To make the values indicated on scale 104, or on the light sensitive paper 105 independent of the angular position of mirror 102, it is necessary to provide a reflecting surface 103 which is shaped so that the distance between the rays reflected from the surface and the indicating unit do not change with the rotation of the mirror 102. Two surfaces which satisfy this condition together with a method of forming the surfaces are shown in FIGURES 6, 6a and 7.

The reflecting surface 103 shown in FIGURES 6, 6a can be obtained by bending a tube 107 until it has a radius R, and length C, where R is the radius and C the length of the scale 104. A portion of the wall 108 of the tube 107 is removed as shown in dashed lines in FIGURE 6. The beam of light 100 will be reflected by the surface 103 on to the scale 104, and will remain on the scale regardless of the angular position of mirror 102.

Another way of producing a reflecting surface having the properties of the reflecting surface 103 shown in FIGURE 6 is to remove a segment of width $\bar{a}$ from a funnel or cone shaped member as shown in FIGURE 7. This segment must have a radius R, a length C and an angle $\alpha=45°$ to reflect the light 106 without distortion upon scale 104. The reflecting surfaces 110 in FIGURES 6, 7 must be polished and must be placed in the gage so that it can be considered a mirror image of the scale 104 in a plane below and parallel to scale 104.

When the pressure in the system is very high and it is desired to use optical means for indicating the variations in pressure within the gage the transparent plates 48, 51, shown in FIGURES 1 and 2, either have to be made very thick or the case modified in the manner shown in FIGURES 8 and 9. The embodiment illustrated in FIGURES 8, 9, consists of a cylindrical housing 123 having curved end cover assemblies 124, 125, at each end thereof. A window 126 is provided in the housing 123 and a simplified optical system 127 is employed to direct a light beam through the said window 126.

A heavy transparent cylindrical member 128 is carried within the housing 123 with its outer surface cemented to the inner surface 129 of the said housing. The housing 123 is also formed with a thickened ring-like member 130 at the upper portion thereof and a narrow slit 131 is cut through the length of the circumference of the heavy ring-like member for a distance equal to the distance of the scale of the gage.

An O-ring 132 is employed between the cover member 124 and the housing 123 to form a hermetic seal when the screws 133 which hold the cover 124 to the housing 123 are tightened. The opposite cover member 125 is preferably welded to the housing 123 as indicated at 134.

Pressure from the system is led into the housing 123 by means of conduits 135, 135a, which are carried by the cover member 124. The pointer 47 in this embodiment of the gage is replaced by a mirror 136 which is attached to the pin 45.

Light coming from a light source 137 located outside of the gage housing 123 is directed through a lens system indicated at 138 of the optical system 127 from which it emerges as parallel rays 139 and is directed through the window 126 to the mirror 136. The mirror 136 reflects and focuses the rays of light upon the scale 104 to produce a visual indication of the differential pressure values within the gage. In the event that the rays of light reflected by the mirror 136 are to be recorded they may be focused upon a light sensitive paper 140 as shown in FIGURES 8 and 9. The pencil of rays reflected from the mirror 136 are so small in diameter and so nearly perpendicular to the tangent plane drawn at their point of exit that bending of the rays between the mirror and the light sensitive paper 140 can be neglected. In order to assure that the distance between the light sensitive paper and the mirror is independent of the angular displacement of the mirror, the paper 140 may be curved to a radius corresponding to the change in angular rotation of the mirror.

FIGURES 10, 11, 12, show a structure for observing the information supplied to pin 45 by the flexible assembly without appreciably weakening the case. The unit reverses the indicating assembly shown in FIGURES 1 and 2, insofar as it secures the scale 143 to pin 45 so that the scale is rotated about the pointer 154 which is fixed, instead of rotating the pointer about a fixed scale. This construction permits the position of the scale to be observed through a relatively small opening the face of the case.

Referring to FIGURES 10, 11, and 12, the cover 141 which is strong enough to withstand the pressure differential $P_1-P_a$ is secured to the gage case 21 by screws 133. The scale 143 has a shoulder 147. This shoulder is fastened to pin 45'. Pin 45' is the same as pin 45 shown in FIGURES 1 and 2, except it has been elongated and supported at its outer end by bearing 144. Bearing 144 is secured to the support 145. Support 145 is secured to platform 22 by means of screws 146, so that a change in the position of platform 22 will cause an equal change in the position of the flexible assembly consisting of bellows 23, 24, and cap member 29, shown in FIGURES 1 and 2, the multiplier assembly 88 and the bearing assembly 144, 145. This means of supporting all the movable elements of the gage on a rigid platform, reduces the probability of the binding of any one element to a minimum.

The window assembly 148 through which the position of scale 143 is observed consists of a cylindrical element 149 which is secured to case 141 and welded at 153 to insure a hermetical seal between the case and the cylindrical element. The window 150 may be a flat piece of transparent material such as glass or quartz, or it may be a lens. The window 150 is hermetically sealed to the cylindrical element 149 as indicated at 151. A cap 152 with an opening of diameter $d$, is screwed into the cylindrical element 149 until it presses with sufficient force on the relatively soft washer 142 to hold it in place and prevent excessive stresses developing in the sealed area 151. The fixed pointer 154 which serves as a point of reference is in the form of an arrow.

FIGURE 12 shows an elliptically shaped window 160 which can be held in place by soldering. When the pressures are not excessive a circular window can be used which has a diameter equal to the length of the major axis of the elliptically shaped window. The position of the pointer 154 can be adjusted by turning screw 158. The screw adjusting assembly consists of bearings 155 and 156 which are secured to case 141 at 161 and 162 respectively. Screw 158 has shoulders 157 and 163 which prevents screw 158 from moving in or out of bearings 155 and 156 when screw 158 is rotated by handle 159. A threaded block 164 which supports the pointer 154 has one surface contacting and sliding over a portion of the surfaces of the case 141, so that when screw 158, is turned, the block 164 is prevented from turning by the case 141 and consequently a rotation of the screw in one direction will force the block 164 and pointer 154 to move in one direction and a rotation of the screw in the opposite direction will cause the block and pointer to move in the opposite direction. In this manner changes in the zero position of the scale due to hysteresis of the flexible element can be compensated for by a shifting of the pointer 154 so that it coincides with the new zero position of the scale.

When the windows 150 or 160 are large enough, sufficient light will pass through the windows to make readings on the scale possible without special illumination. When special illumination is required, the markings on the scale may be made of radio active material such as is used in marking the dials of watches and clocks or light may be brought into the case through the second window assembly 166 (shown in FIGURE 10) which has the same construction throughout as the larger window assembly 148.

A beam of light 167 from a light source indicated at 165 passes through window 163 to the total reflecting prism 159 where it is reflected as beam 168 to the markings on scale 143.

Figure 13:
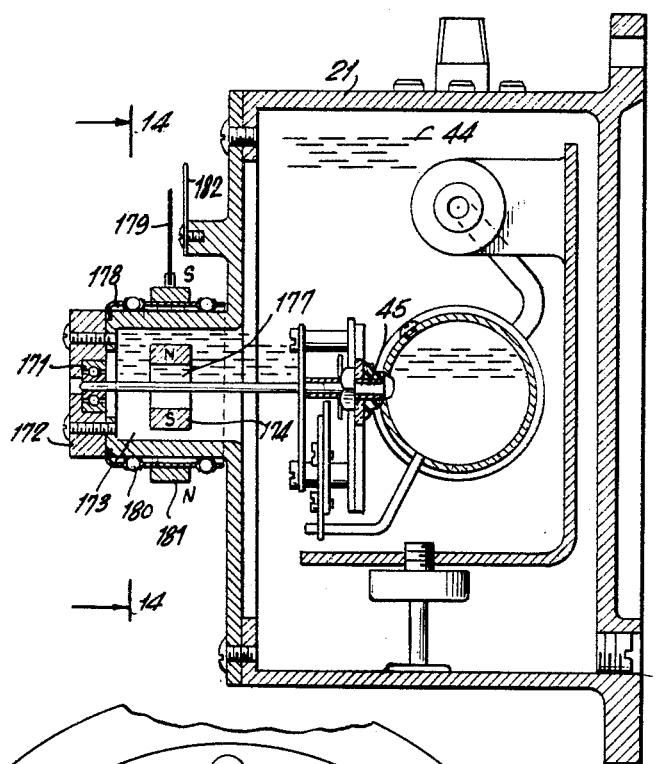
FIGURES 13, 14, are fragmentary views of a magnetic gage actuating device for recording the movement of a gage through the gage case.
Figure 14:
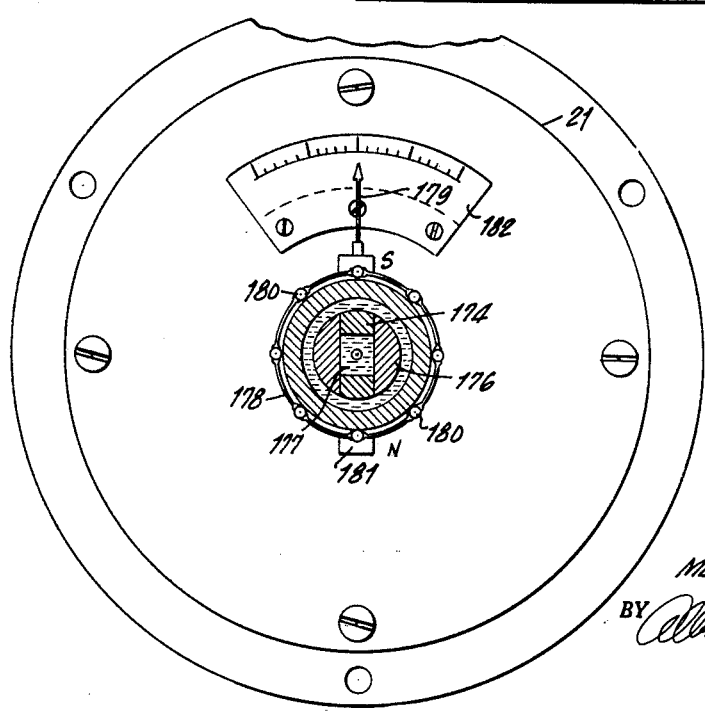

Referring to FIGURES 13 and 14, there is shown still another structure for bringing the information supplied to the pin 45 by the sensing element to the recorder or indicator. In FIGURES 13, 14, the pin 45 is enlonged and supported at its outer end by a bearing 171. The bearing 171 is carried within a small cap 172 which forms the cover for an outwardly extending cylindrical enclosure 173 secured to the case 21. The enclosure 173 is in fluid communication with the interior of the case 21 so that the fluid 44 within the case fills the enclosure 173. A magnet 174 is secured to the elongated pin 45 within the enclosure 173. The magnet 174 as shown in FIGURE 14 is balanced by having attached thereto small non-magnetic segments 176, having the same density as the iron in the magnet 174. In this manner the weight of the magnet as it is rotated will not affect the reading on the gage, since the assembly is dynamically balanced. In addition, the center of the magnet 174 may be provided with a chamber 177 having a volume such that the effective density of the magnetic assembly will be equal to the density of the enveloping fluid 44. The outside of the cylindrical enclosure 173 is provided with an indicating ring 178 to which there is secured a pointer 179. The ring 178 is supported upon the enclosure 173 by ball-bearings 180 which reduce to a minimum the frictional contact between the ring 178 and the enclosure 173. When the pin is deflected by the operation of the sensing bellows within the case 21 it causes the magnetic member 174 to rotate within the enclosure 173. A complimentary magnetic element 181 is carried by the indicating ring 178 so that its poles lie opposite those of the magnetic member 174 within the enclosure. The magnetic flux passing through the chamber 173 locks the magnets 174, 181, together and thereby translates the rotation of the magnet 174 into a rotation of the ring 178 and the pointer 179. The rotation of the pointer 179 can be converted into a reading of pressure by means of the scale 182 on the face of the case 21. It will be seen that by means of the structure shown in FIGURES 13 and 14, the case 21 can be completely sealed and an accurate indication of the recorded pressure transmitted therethrough.

It has been found that when the gage is subjected to shaking forces which are in the neighborhood of the free period of vibration of the bellows, that sufficient vibration of the bellows may take place to cause the pointer to oscillate. This resonance vibration of the flexible assembly can be reduced by introducing a means of dampening the bellows. An effective way of dampening the flexible assembly is to replace one or more of the bellows shown in FIGURES 1 to 4 inclusive by bellows which have alternate plates or convolutions of different diameters $D_1$, $D_2$. Bellows answering this description are shown in FIGURES 15 and 16. Each of the bellows shown in these two figures have plates formed so that they may nest without rupturing the bellows.

The bellows consists of alternate convolutions 169, 170. The effective diameter of the convolution 169 is less than the effective diameter of the convolution 170. When these than the either filled with a liquid, or enveloped with a liquid, or both filled and enveloped with a liquid, they cannot vibrate without pumping liquid. Since all fluids have viscosity the pumping of the viscous liquid serves as a dampening agent. A description of this method of dampening the vibration of bellows is shown in Patent No. 2,942,838, issued to Melville F. Peters, June 28, 1960.

Figure 17:
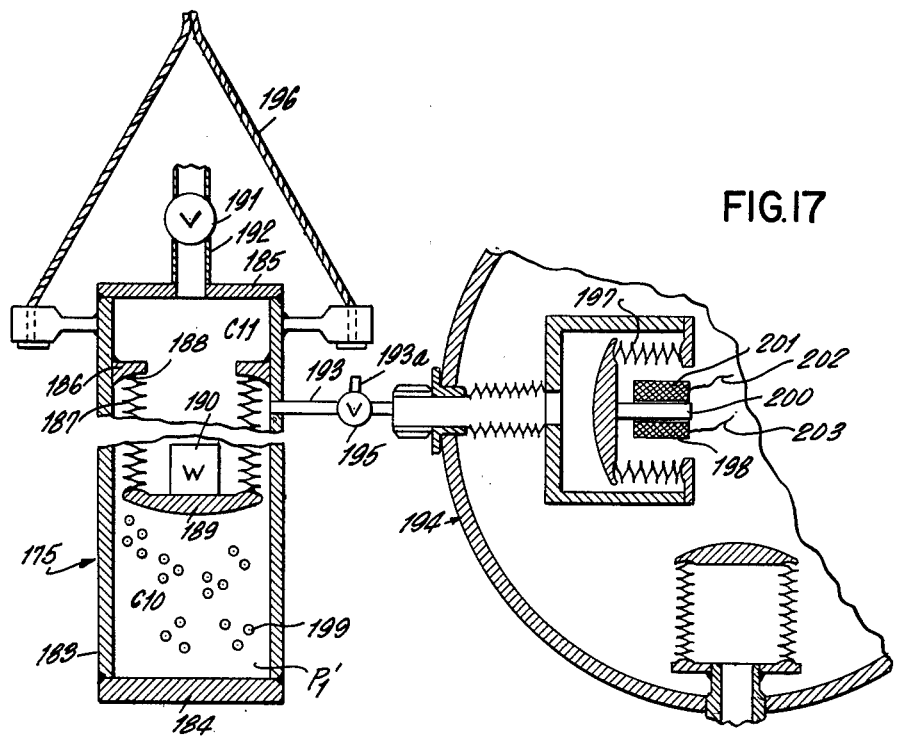
FIGURE 17 is a somewhat diagrammatic cross-sectional view of a constant reference pressure chamber for a gage.

In certain applications it is highly desirable to provide a standard reference pressure $P_{1'}$ which is not effected by a change in temperature. This result can be accomplished by putting a flexible wall in the chamber which is to contain the pressurized gas and by using the earth's gravitational field to exert a constant force on this wall. A unit which can be used with the gages illustrated in FIGURE 4 to achieve this purpose is shown in FIGURE 17. The standard reference pressure unit 175 consists of a cylindrical tube-like housing 183 sealed at one end by a heavy end plate 184, and having at its opposite end a second end plate 185. An internal shoulder 186 is provided in the housing 183 near the upper end of the said housing. A nesting type bellows 187 having a negligible pressure constant is carried within the housing 183 and is welded at one end to the shoulder 186 as indicated at 188, the opposite end of the bellows 187 is sealed by a plate 189 which is welded thereacross. The plate 189 thus divides the housing 183 into two chambers $C_{10}$ and $C_{11}$.

A weight 190 is attached to the plate 189 within the bellows 187.

The upper end plate 185 is connected to a valve 191 which is carried by the fluid line 192. A second fluid line 193 interconnects the chamber $C_{10}$ in the housing 183 with the pressure sensitive device 194. A two-way valve 195 is provided in the line 193 between the housing 183 and the pressure sensitive device 194. The valve 195 can be turned so as to introduce gas through pipe 193a or turned so as to allow the gas in chamber $C_{11}$ to operate on the bellows assembly 187.

When placed in operation the device can be lowered by means of the cable 196 attached thereto or positioned with gimbals and the differential pressure indicated by the bellows assembly 197, recorded by using the conventional electro-magnetic pickup assembly indicated at 198. The chamber $C_{11}$ is evacuated through the conduit 192 and sealed by closing the valve 191. The chamber $C_{10}$ is pressurized through conduit 193 and the chamber sealed when sufficient gas 199 has been admitted to support the weight 190. The pressure $P_{1'}$, of the gas in the chamber $C_{10}$ is equal to $W/\overline{A}$, where $\overline{A}$ is the effective area of the bellows and it is independent of the height of the weight 190 in the cylindrical housing 183. If the temperature increases the gas will expand and increase the volume of the chamber $C_{10}$ until the pressure is $P'_1$. If the gas is cooled the gas will contract and the weight 190 will be lowered in the chamber $C_{10}$ until the pressure is again $P'_1$.

Figure 18:
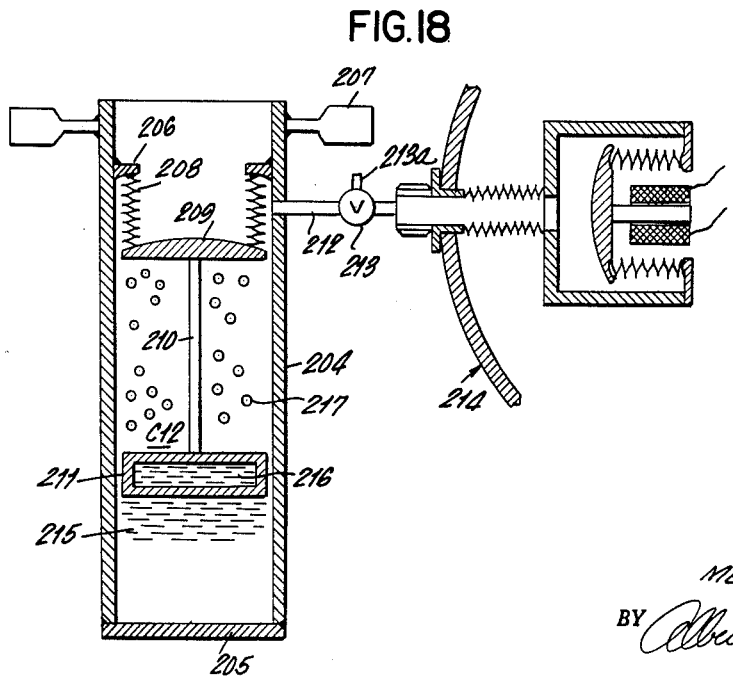
FIGURE 18 is a somewhat diagrammatic cross-sectional view of a constant reference pressure chamber which will withstand high frequency transients.

The electro-magnetic pickup 198 consists of a rod 200 of ferro magnetic material, a coil 201 therearound and leads 202, 203, which transmit the electrical signal to a bridge type indicator or recorder (not shown).

Where it is desired to measure high frequency transient pressure differentials in systems which undergo relatively large and slow changes in temperature and pressure, the embodiment shown in FIGURE 18 may be used. In this form of the invention the reference pressure is established by using the ambient pressure to compress the gas in a chamber having one flexible wall. The flexible wall consists of a bellows 208 made from very thin material so that it will have a small pressure constant. Attached to one end of the bellows is a heavy mass and a float 211. It will be seen that the assembly includes a cylindrical housing 214 closed at one end by an end plate 205 and having an internal shoulder 206 spaced from the opposite end of said housing 204. The housing 204 is provided with bearings 207 whereby the said housing may be supported in a conventional type of gimbals to insure that the unit will be suspended in a vertical position.

A nesting type bellows 208 is carried within the housing 204 and is secured at one end to the shoulder 206. The opposite end of the bellows 208 is closed by a heavy plate 209 having a rod 210 secured to and depending therefrom. At the free end of the rod 210 there is attached a float 211. A conduit 212 is connected at one end to the interior of the housing 204 and at its other end to a pressure sensing device 214. A valve 213 is inserted in the conduit 212. The bellows 208 and plate 209, together with the end plate 205 form a chamber $C_{12}$ within the housing 204. A suitable quantity of fluid 215 sufficient to envelope the float 211 is carried within the chamber $C_{12}$. The float 211 is also provided with a desired amount of liquid 216 so that the weight of the flexible assembly consisting of the bellows, the plate 209, the rod 210, and the float 211, will just equal the weight of the fluid 215 displaced by the float 211.

Since the pressure constant of the bellows 208 is small, the pressure in the chamber $C_{12}$ is always equal to the ambient pressure. The cross-sectional area of the rod 210 is small and consequently the weight of the fluid 215 displaced by the float 211 and rod 210 is practically independent of the depth of the float in the liquid. A suitable quantity of gas 217 is introduced into the chamber $C_{12}$ at a desired pressure, by turning the two-way valve 213 so that chamber $C_{12}$ can receive gas introduced through inlet 213a.

When a high frequency pressure disturbance contacts the gage or pressure sensing device 214, the inertia of the flexible wall of the pressurized chamber $C_{12}$ is so great that no appreciable movement takes place in the flexible wall during the life of the transient pressure wave, and consequently there is no change in pressure of the pressurized gas 217 in the chamber during this period of time.

The assembly shown in FIGURE 19 can be used to record the changes in pressure which take place at some depth below the surface of the water when the reference pressure $P_a$ is taken as the barometric pressure above the surface of the water, or to record the changes in pressure that take place at some depth below the surface when the reference presure $P'_1$ is a pressurized gas within a chamber which is part of the assembly. The pressures recorded by the recorder would show for example, the pressure variations experienced by a mine when anchored in the position occupied by the gage assembly.

The unit consists of an outer watertight compartment 218 containing the differential pressure measuring and recording elements, an anchoring assembly generally indicated at 219, for the watertight compartment 218 and a buoy 220 having a flexible conduit 221 which constitutes the assembly for establishing the pressure of the atmosphere in the watertight compartment 218. A valve assembly 222 is provided in the conduit 221 to seal the watertight compartment when the gas 223 in the compartment is pressurized to $P'_1$.

The watertight compartment 218 consists of a cylindrical casing 224 to which is welded an end plate 225 at 226, and which is closed at the other end by a cover 227 which can be removed or made fluid tight by removing or tightening screws 228. Heavy cylindrical tubes 229, 230, having holes or openings 231, 232, therein are respectively secured to the watertight compartment 228 at 233 and 234.

The compartment 218 contains an inner chamber 235 with opening 236 therein to equalize the pressure on its inner and outer surfaces. The lower end 237 of the inner chamber 235 can be removed by removing screws 238. The chamber 235 is supported by the three flexible hangers 239 so as to reduce the shock transmitted from the watertight compartment 218 to the inner chamber 235. The conduit 221a is connected to the opening 231 of valve 222 in the cylindrical tube 229, so that a fluid path is formed between valve 222 and a water trap 240 in the compartment 218. The water trap consists of the cylindrical element 241 secured to conduit 221a and an outlet 242 on conduit 221a which allows an equalization of pressure between the fluids in opening 231 and the two chambers $C_{13}$, $C'_{13}$, within the compartment 218. The conduit 221a is curved so that if water should collect in the trap it will not spill into chamber $C_{13}$ when the compartment 218 is tipped. A flexible conduit or bellows 243 has one end connected to bore 232 in the bearing-like element 234 at 245 and the other end secured to a water filter 246 at 247. The other end of filter 246 is connected to the inlet of the pressure sensing assembly, which is similar to the unit shown in FIGURE 4, by means of conduit 249, so that the pressure $P_x$ at the opening of bore 232 is transmitted to the differential pressure sensing assembly consisting of thimble 60, bellows 56, rod 65, multiplying unit 70, and mirror 136, the details of which are shown in FIGURES 8 and 9. The optical unit 127 shown in detail in FIGURES 8 and 9 records the angular rotation of mirror 136, which is proportional to the pressure differential $(P_d - P_a)$ on the light sensitive paper 140 of the recorder 140a, where $P_d$ is the value of $P_x$ at depth $d$. The temperature $T_d$ is measured and recorded by the temperature recording unit 250.

The anchoring assembly 219 consists of an anchor 251, a chain or cable 252 secured to the anchor at eyelet 253, and a saddle 254 which is secured to the cable 252 at the eyelet 253. Bearings 255, 256, on the upper end of the saddle allow the two cylindrical tubes 229, 230, to rotate as the outer watertight compartment 224 is forced to rotate through small angles without an appreciable change in the depth of the pressure inlet opening 232.

The buoy 220 consists of a vessel 257 which will float because it is made of material having a lesser density than water, or because it contains hermetically sealed chambers 258, a dome 259 which limits the amount of water which can be splashed into chamber $C_{14}$ of the vessel, and strips 260 to secure dome 259 to vessel 257 while allowing air outside the vessel to enter and circulate in chambers $C_{14}$ and $C'_{14}$. Openings 261 allow water splashed into chamber $C_{14}$ to leak back into the water 262. The conduit 263 is attached to conduit 221 and vessel 257 at 264 so that air at a barometric pressure of $P_a$ can pass from the bulb 265 to the chamber $C'_{13}$. The bulb 265 serves as a baffle insofar as it prevents the small drops of water from entering conduit 263.

The complete assembly includes the small diameter flexible hose 221 connected to the lower end of conduit 263 by a conventional fitting 264. The other end of the conduit 221 is connected to valve 222 with a conventional fitting 266, so that the barometric pressure $P_a$ above the surface of the water has a fluid path to the valve 222.

The valve 222 is provided with a handle 267. When the handle 267 is turned to open the valve, a fluid path is established between conduit 221, opening 231, the tube 229, conduit 221a, curved outlet 242, and chambers $C_{13}$ and $C'_{13}$. A pressure is thereby established in the two chambers $C_{13}$ and $C'_{13}$, equal to the barometric pressure $P_a$, unless the depth $D_x$ of the watertight compartment 218 is so great that the weight of the column of air in the conduit 221 per unit must be added to the ambient pressure $P_a$. When the valve 222 is closed, the reference pressure will be the pressure in chamber $C_{13}$, $C'_{13}$, at the instant the valve is closed. This pressure becomes the reference pressure $P'_1$, and in general will be equal to the pressure $P_d$ at a depth of $D_x$. Since the pressure $P'_1$ will change with temperature, a temperature recording unit 250 is put in chamber $C'_{13}$ so that the true pressure $P'_1$ can be obtained by applying temperature corrections to the recorded pressure.

The changes taking place in the depth of the water, $D_x$ $(D_1 - D_0)$ with time, is obtained by anchoring the sensing and recording elements in the watertight compartment 218 at a height $h_n$ above the bottom of the ocean. When the valve 222 is open the recorded values $(P_d - P_a)$ are independent of the temperature and the barometric pressure. When the valve 222 is closed and the reference pressure $P'_1$ is confined, the recorded differential pressures $(P_d - P'_1)$ must be corrected for changes in the temperature and in the barometric pressure.

Having thus fully described the invention, what is claimed as new and desired to be secured by Letters Patent of the United States, is:

1. A differential pressure responsive device comprising a sealed fluid tight case, at least one pressure sensing bellows, and a pressure equalizing bellows within the case, means to secure at least one end of the said pressure sensing and pressure equalizing bellows within the case, support means carried by the case and secured to one end of said bellows, a sealed buoyant chamber secured to the free end of the sensing bellows, a quantity of fluid in each of said bellows, a quantity of liquid comprising a bellows supporting material within the case surrounding the bellows, means to apply a first pressure to the interior of the pressure sensing bellows, means to apply a second pressure to the interior of the pressure equalizing bellows to transmit the pressure differential applied to the sensing bellows to the inside of the case, a pressure differential indicator operatively connected to at least one of said bellows.

2. A differential pressure responsive device comprising a sealed fluid tight case, a first and a second pressure sensing bellows, and a pressure equalizing bellows within the case, means to secure at least one end of the said pressure sensing and pressure equalizing bellows within the case, a support means carried by the case and attached to one end of each of the pressure sensing bellows, a sealed buoyant chamber interconnecting the free ends of the pressure sensing bellows, a fluid bearing line between the pressure equalizing bellows and one of the pressure sensing bellows, a quantity of fluid in each of said bellows, a quantity of liquid comprising a bellows supporting material within the case surrounding the bellows, means to apply a first pressure to the interior of one of the pressure sensing bellows, means to apply a second pressure to the interior of the other pressure sensing bellows and to the interior of the pressure equalizing bellows to transmit the pressure differential applied to the sensing bellows to the inside of the case, and a pressure differential indicator operatively connected to at least one of said bellows.

3. A differential pressure responsive device comprising a sealed fluid tight case, a first and a second pressure sensing bellows, and a pressure equalizing bellows within the case, means to secure at least one end of the said pressure sensing and pressure equalizing bellows within the case, a support means carried by the case and attached to one end of each of the pressure sensing bellows, a sealed buoyant chamber interconnecting the free ends of the pressure sensing bellows, a fluid bearing line between the pressure equalizing bellows and one of the pressure sensing bellows, a quantity of fluid in each of said bellows, a quantity of liquid comprising a bellows supporting material within the case surrounding the bellows, means to apply a first pressure to the interior of one of the pressure sensing bellows, means to apply a second pressure to the interior of the other pressure sensing bellows and to the interior of the pressure equalizing bellows to transmit the pressure differential applied to the sensing bellows to the inside of the case, and a pressure differential indicator operatively connected to the sealed buoyant chamber.

4. A device according to claim 3 in which the first and second pressure sensing bellows have equal effective areas.

References Cited in the file of this patent
UNITED STATES PATENTS

| | | |
|---|---|---|
| 2,497,255 | Brown | Feb. 14, 1950 |
| 2,627,750 | Titus | Feb. 10, 1953 |
| 2,750,799 | Weingard | June 19, 1956 |
| 2,812,995 | Morris | Nov. 12, 1957 |